United States Patent
Idnani

(10) Patent No.: US 8,912,919 B2
(45) Date of Patent: Dec. 16, 2014

(54) DETERMINATION OF RESOURCE CONSUMPTION

(71) Applicant: Tata Consultancy Services Limited, Mumbai Maharashtra (IN)

(72) Inventor: Ajay Idnani, Hoffman Estates, IL (US)

(73) Assignee: Tata Consultancy Services Limited (IN)

( * ) Notice: Subject to any disclaimer, the term of this patent is extended or adjusted under 35 U.S.C. 154(b) by 15 days.

(21) Appl. No.: 13/850,325

(22) Filed: Mar. 26, 2013

(65) Prior Publication Data
US 2014/0197964 A1 Jul. 17, 2014

(30) Foreign Application Priority Data
Jan. 15, 2013 (IN) .......................... 138/MUM/2013

(51) Int. Cl.
*G08C 15/06* (2006.01)
*G01D 4/00* (2006.01)

(52) U.S. Cl.
CPC ..................................... *G01D 4/002* (2013.01)
USPC .............. 340/870.02; 340/870.03; 340/636.1; 702/60; 702/61; 702/62

(58) Field of Classification Search
CPC .............................. G01D 4/002; G01D 22/063
USPC ......... 340/870.02, 870.03, 636.1; 702/60, 61, 702/62
See application file for complete search history.

(56) References Cited

U.S. PATENT DOCUMENTS

| 7,174,260 | B2 * | 2/2007 | Tuff et al. ........................ 702/61 |
| 7,541,941 | B2 * | 6/2009 | Bogolea et al. .......... 340/870.02 |
| 2005/0190074 | A1 * | 9/2005 | Cumeralto et al. ...... 340/870.02 |
| 2007/0247331 | A1 | 10/2007 | Angelis et al. |
| 2010/0274695 | A1 | 10/2010 | Thomas et al. |

FOREIGN PATENT DOCUMENTS

GB       2002937 A    2/1979

OTHER PUBLICATIONS

"Meter Reading Validation Algorithm", Copyright Elexon 2011, Presented to the Supplier Volume Allocation Group, Aug. 2002, (Aug. 2002), 14 pgs.

* cited by examiner

*Primary Examiner* — Tai T Nguyen
(74) *Attorney, Agent, or Firm* — Schwegman Lundberg & Woessner, P.A.

(57) ABSTRACT

System and method for determining consumption of resources to assist a meter reading personnel are described. According to an embodiment, the system includes a processor and an extraction module coupled to the processor configured to extract historical data associated with a meter to be read. The system further includes a prediction module coupled to the processor configured to determine a predicted resource consumption for a current cycle based on the historical data and provide the predicted meter reading to a display device corresponding to a meter reading personnel. Furthermore, the system includes a computation module coupled to the processor configured to determine an actual resource consumption for the current cycle based on an analysis of an observed resource consumption of the current cycle with respect to the predicted resource consumption.

16 Claims, 2 Drawing Sheets

DETERMINATION OF RESOURCE CONSUMPTION

CLAIM OF PRIORITY

This application claims the benefit of priority of Indian Patent Application Serial Number 138/MUM/2013, entitled "DETERMINATION OF RESOURCE CONSUMPTION," filed on Jan. 15, 2013, the benefit of priority of which is claimed hereby, and which is incorporated by reference herein in its entirety.

TECHNICAL FIELD

The present subject matter relates, in general, to determining consumption of resources and, in particular, to determining resource consumption using utility meters.

BACKGROUND

Resources, such as gas, electricity, and water are generally provided by utility companies around the world to households, businesses, and other consumers. The utility companies typically charge the consumers based on an amount of resources consumed by a consumer. For this, utility companies may deploy a meter, which functions as a measurement device to provide information pertaining to consumption of a particular resource. In other words, the meter may determine the amount of resources consumed, for example, an electricity meter determines amount of electricity consumed, a water meter measures amount of water utilized, and a gas meter that measures amount of gas burnt.

The meter may be located at the consumer's structure or site of distribution of the resources. The consumer's structure may be, for example, the consumer's home or office. The meter may be owned by the utility company and may be installed in a standard meter box. Thus, utility companies gauge consumption using the meters and bill their consumer's. Accordingly, periodic reading in a predetermined cycle, such as monthly, quarterly, and half yearly of the meter may be performed to determine the resource consumption and to bill the consumer for the amount consumed. Normally, such meters are manually read by sending service personnel commonly known as meter reading personnel, to each of the meters location.

The meter reading personnel read, check, and record resource consumption as displayed on the meters. Typically, the meter reading personnel may plan and prepare for their meter rounds, read all of the meters in a particular area and enter the meter readings into a hand-held computer. The process of gathering meter information may be cumbersome for a meter reading personnel, who may have to cover a given location on foot or through a vehicle. Often times, errors are introduced during the collection of meter readings. Such errors may not only lead to consumer dissatisfaction but may also result in loss of time, resources, and capital, since the meter reading personnel may be required to revisit the meter location for rectifying the errors.

SUMMARY

This summary is provided to introduce concepts related to determining consumption of resources to assist a meter reading personnel. This summary is neither intended to identify essential features of the claimed subject matter nor is it intended for use in determining or limiting the scope of the claimed subject matter.

In an embodiment, a system for determining consumption of resources to assist a meter reading personnel is described. The system includes a processor and an extraction module coupled to the processor, which is configured to extract historical data associated with a meter to be read. The historical data includes details pertaining to previous resource consumption associated with the meter. The system further includes a prediction module, coupled to the processor, configured to determine a predicted resource consumption for a current cycle based on the historical data. The prediction module may also provide a predicted meter reading to a display device corresponding to the meter reading personnel. Furthermore, the system includes a computation module coupled to the processor, configured to determine an actual resource consumption for the current cycle based on an analysis of an observed resource consumption of the current cycle with respect to the predicted resource consumption.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the drawings to reference like features and components.

Figure 1:
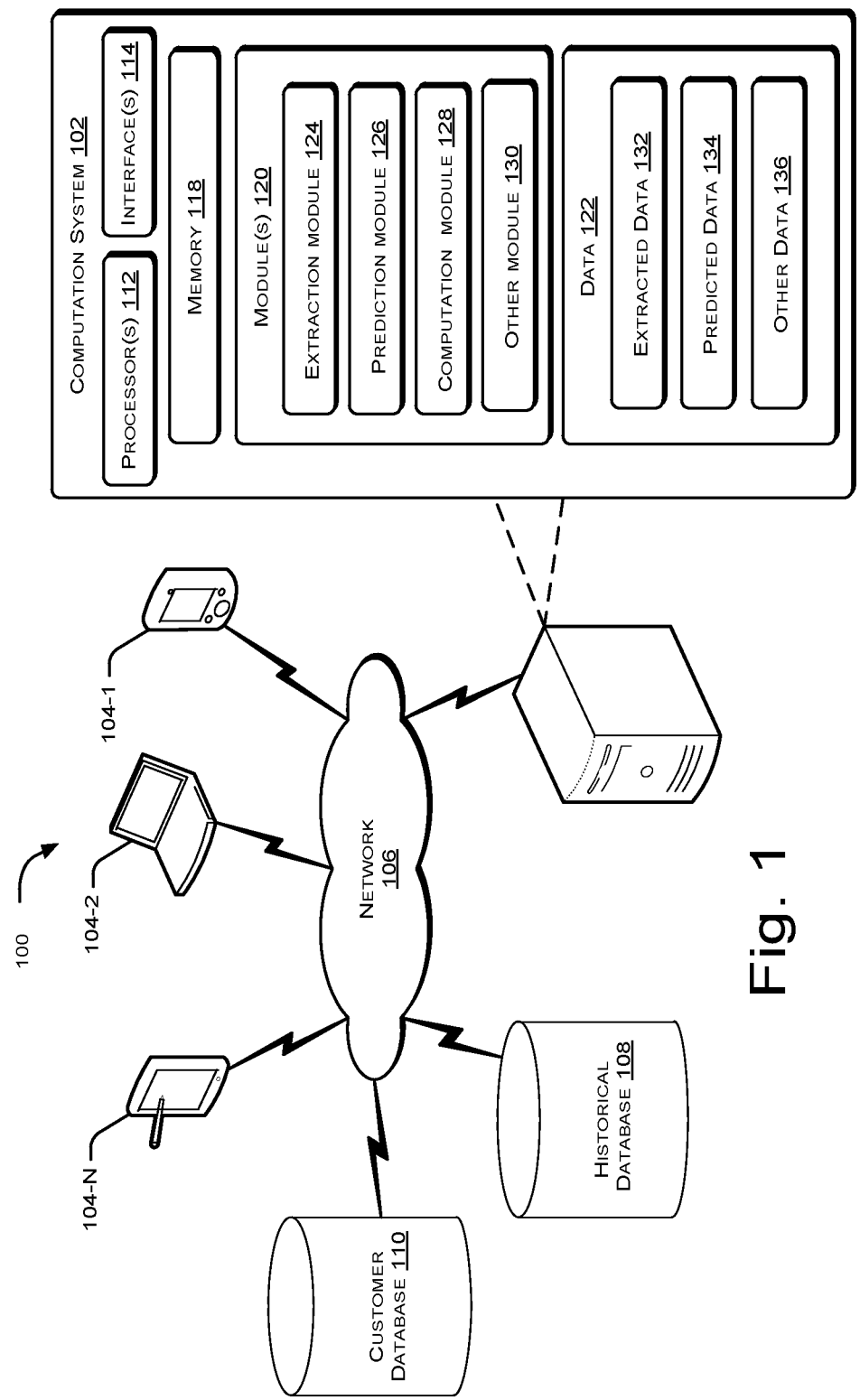
FIG. 1 illustrates a network implementing a computation system for determining consumption of resources, in accordance with an embodiment of the present subject matter.

It should be appreciated by those skilled in the art that any block diagrams herein represent conceptual views of illustrative systems embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Systems and methods for determining consumption of resources to assist a meter reading personnel are described herein. The resources may include utilities, such as electricity, gas, water, and the like. The systems and methods may be implemented in a variety of devices. Further, the devices may include, for example, hand-held devices, laptops or other portable computers, such as mobile phones, landline phones, and the like.

Generally, utility meters are manually read by sending meter reading personnel to a utility meter location. The manual meter reading preformed by a meter reading personnel often results in additional costs, which may incurred due to human errors in assimilating meter reading accurately. An erroneous reading may, for example, result in generation of an incorrect bill with huge amount, often motivating consumers not to pay. Also, incorrect manual readings may lead to consumer complaints, thereby, involving additional costs, such as costs associated with routing and processing the complaints from a call centre to the meter department, sending the meter reading personnel for verification, and the like.

According to an implementation of the present subject matter, systems and method for determining consumption of resources are described herein. In an embodiment, the determination of consumption of the resources is based on predicted resource consumption for a current cycle. The predicted resource consumption may be computed using a resource consumption predicting technique. Further, based on the predicted resource consumption and an observed resource consumption, an actual resource consumption for the current cycle may be determined.

In an implementation, a meter to be read by a meter reading personnel is identified based on identification parameters. The identification parameters may be provided by the meter reading personnel or may be captured by using a barcode reader, a camera, and like. The identification parameter may include a unique customer number, a street name, a house number, global positioning system (GPS) co-ordinates and the like, which may be used to uniquely identify the meter. Further, historical data associated with the identified meter may be extracted from a historical database. The historical data includes, for example, information related to the previous meter readings corresponding to the identified meter, meter readings of the surrounding structures, and weather details, such as temperature, and precipitation.

Further based on the historical data, predicted resource consumption for a current cycle is computed. The predicted resource consumption may further be provided to the meter reading personnel. Additionally, the observed resource consumption, for the current cycle, as indicated by the meter may be received. For example, the predicted resource consumption may be displayed to the meter reading personnel for assisting the meter reading personnel. The displayed predicted resource consumption may be edited by the meter reading personnel. For example, the meter reading personnel may change few digits of the predicted resource consumption or in case predicted meter reading is same as the one he has observed, the predicted meter reading may be accepted without further alteration. In the latter case, approval by the meter reading personnel may be taken as an observed resource consumption.

The observed resource consumption may be analyzed with reference to the predicted resource consumption to determine the accuracy of the observed resource consumption. Further, according to the present subject matter, the predicted resource consumption and the subsequent analysis may assist the meter reading personnel in assimilating an actual resource consumption, thereby increasing accuracy. For example, the meter reading personnel may be provided with reconfirmations messages in case the observed resource consumption is not in a predetermined range of the predicted resource consumption. Based on such analysis and reconfirmation the last observed resource consumption is obtained as the actual resource consumption.

Thus, the present subject matter guides a meter reading personnel to observe a correct meter reading thereby providing for a reduction in number of erroneous meter reads and increasing the accuracy. Accurate meter reading may in turn provide for reduction in cost associated with rectifying the erroneous reading and a reduction in number of unsatisfied customers. Further, a reduction in number of unsatisfied customers in turn may result in increases of popularity, goodwill, and brand image for the utility company along with increased customer retention and turnover.

Although the description herein is with reference to a utility meter, it would understood that the systems and methods may be implemented for other applications, albeit with a few variations, where the actual resource consumption can be predicted based on multiple parameters, as will be understood by a person skilled in the art.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes and programs can be stored in a memory and executed by a processing unit.

In another firmware and/or software implementation, the functions may be stored as one or more instructions or code on a non transitory computer-readable medium. Examples include computer-readable media encoded with a data structure and computer-readable media encoded with a computer program. The computer-readable media may take the form of an article of manufacturer. The computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk, and Blue-ray disc where disks usually reproduce data magnetically, while discs reproduce data optically with lasers. Combinations of the above should also be included within the scope of computer-readable media.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Figure 2:
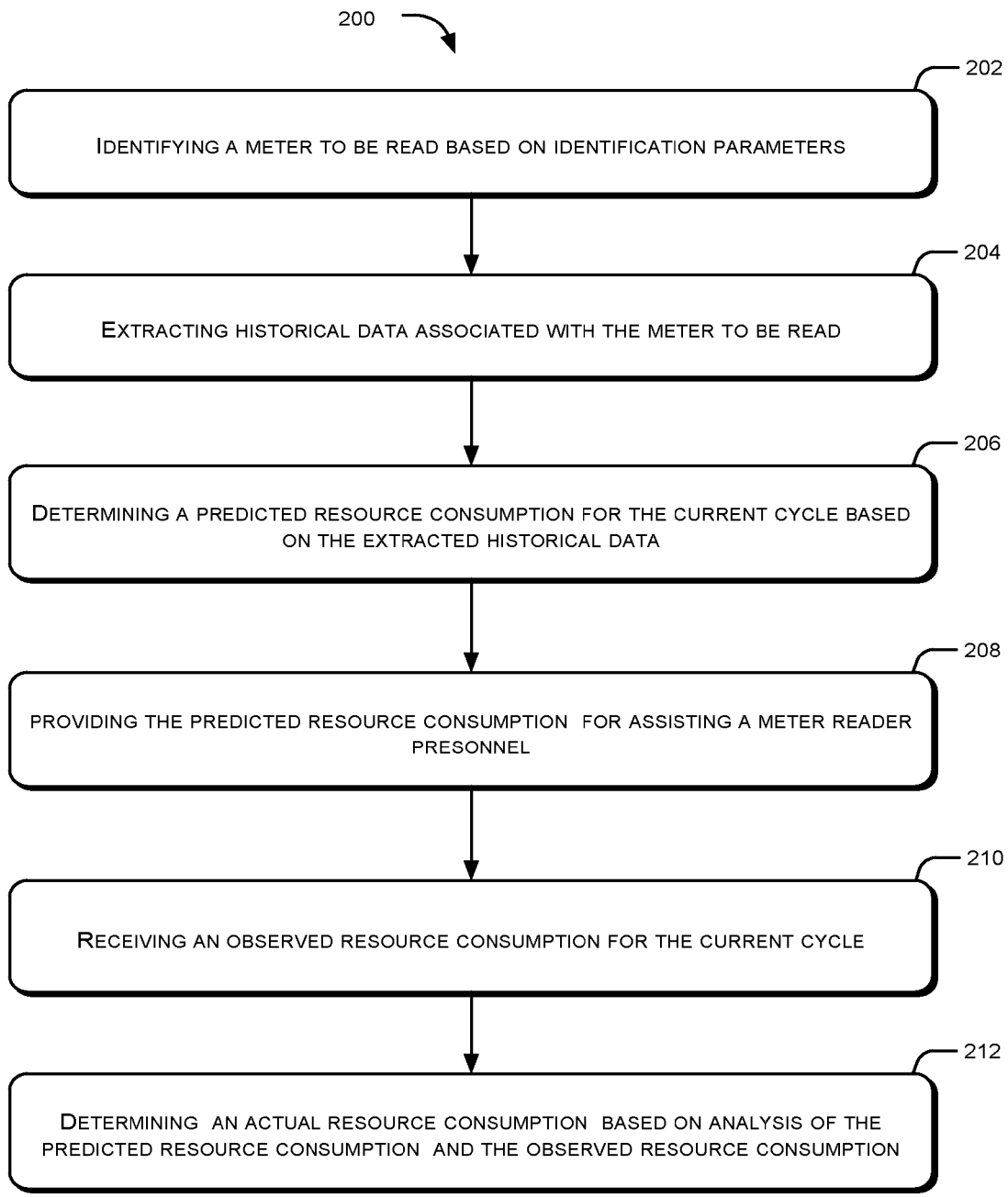
FIG. 2 illustrates a method for determining resource consumption, in accordance with an embodiment of the present subject matter.

The manner, in which the systems and methods of assisting in reading a meter reading accurately shall be implemented, has been explained in details with respect to the FIGS. 1 and 2. While aspects of described systems and methods for assisting in reading a meter reading accurately can be implemented in any number of different computing systems, utility environments, and/or configurations, the embodiments are described in the context of the following exemplary system(s).

FIG. 1 illustrates a network implementing a computation system 102 for determining consumption of resources. The computation system 102 can be implemented as a variety of communication devices, such as a laptop computer, a notebook, a workstation, a mainframe computer, a server and the like. The computing system 102 described herein, can also be implemented in any network environment comprising a variety of network devices, including routers, bridges, servers, computing devices, storage devices, etc. Further, the computing system 102 may be implemented inside meter reading devices 104.

In one implementation, the computation system 102 is connected to one or more meter reading devices 104-1, 104-2 . . . 104-N, individually and commonly hereinafter referred to as device(s) 104, and historical database 108 and customer database 110, through a network 106. The devices 104 may be implemented as, but are not limited to, hand-held devices, laptops or other portable computers, tablet computers, mobile phones, personal digital assistants (PDAs), Smartphone, and the like. The devices 104 may be located within the vicinity of the computing system 102 or may be located at different geographic location as compared to that of the computation system 102. Further, the devices 104 may themselves be located either within the vicinity of each other, or may be located at different geographic locations.

The network 106 may be a wireless or a wired network, or a combination thereof. The network 106 can be a collection of individual networks, interconnected with each other and functioning as a single large network (e.g., the internet or an intranet). The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other.

The historical database 108 and the customer database 110 may be implemented as, but not limited to, enterprise database, remote database, local database, and the like. The historical database 108 and customer database 110 may be located within the vicinity of the computing system 102 and devices 104 or may be located at different geographic location as compared to that of the computing system 102 and devices 104. Further, the historical database 108 and the customer database 110 may themselves be located either within the vicinity of each other, or may be located at different geographic locations. Furthermore, the historical database 108 and customer database 110 may be implemented inside the device 104 or inside the computing system 102 or the historical database 108 and customer database 110 may be implemented as a single database.

In one implementation, the computation system 102 includes processor(s) 112. The processor 112 may be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in a memory.

The functions of the various elements shown in the figure, including any functional blocks labelled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

Also, the computation system 102 includes interface(s) 114. The interfaces 114 may include a variety of software and hardware interfaces that allow the computing system 102 to interact with the entities of the network 106, or with each other. The interfaces 114 may facilitate multiple communications within a wide variety of networks and protocol types, including wire networks, for example, LAN, cable, etc., and wireless networks, for example, WLAN, cellular, satellite-based network, etc.

The computation system 102 may also include a memory 118. The memory 118 may be coupled to the processor 112. The memory 118 can include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the computation system 102 may include module(s) 120 and data 122. The modules 120 may be coupled to the processors 112 and amongst other things, include routines, programs, objects, components, data structures, etc., which perform particular tasks or implement particular abstract data types. The modules 120 may also be implemented as, signal processor(s), state machine(s), logic circuitries, and/or any other device or component that manipulate signals based on operational instructions.

Further, the modules 120 can be implemented in hardware, instructions executed by a processing unit, or by a combination thereof. The processing unit can comprise a computer, a processor, a state machine, a logic array or any other suitable devices capable of processing instructions. The processing unit can be a general-purpose processor which executes instructions to cause the general-purpose processor to perform the required tasks or, the processing unit can be dedicated to perform the required functions.

In another aspect of the present subject matter, the modules 120 may be machine-readable instructions (software) which, when executed by a processor/processing unit, perform any of the described functionalities. The machine-readable instructions may be stored on an electronic memory device, hard disk, optical disk or other machine-readable storage medium or non-transitory medium. In one implementation, the machine-readable instructions can be also be downloaded to the storage medium via a network connection.

In an implementation, the modules 120 include an extraction module 124, a prediction module 126, a computation module 128, and other module(s) 130. The other module(s) 130 may include programs or coded instructions that supplement applications or functions performed by the system 102. Further, the data 122 may include extracted data 132, predicted data 134, and other data 136. The other data 136, amongst other things, may serve as a repository for storing data that is processed, received, or generated as a result of the execution of one or more modules in the modules 120. Although the data 122 is shown internal to the computation system 102, it may be understood that the data 122 can reside in an external repository (not shown in the figure), which may be coupled to computation system 102.

For example, consider a metro city, such as London, where an AB electricity company supplies electricity to various consumers in London. In such a scenario, the AB electricity company may collect consumption details using electricity meters and may bill its customers accordingly. Further for collecting such information, the AB electricity company may send meter reading personnel equipped with device 104 for assisting the meter reading personnel in reading the meter reading accurately. For determining the resource consumption for a consumer, the meter reading personnel may activate the computation system 102.

As described before, in one implementation, the computing system 102 is configured to determine consumption of resources for assisting a meter reading personnel. In said implementation, the device 104 may connect to the computing system 102 the historical database 108 and the customer database 110 by the network 106. In another implementation, the computation system 102, the historical database 108, and the customer database 110 may be deployed inside devices 104. In an implementation, for determining resource consumption for a consumer, a corresponding meter is identified. For the purpose, the meter reading personnel may provide one or more identification parameters to the computation system 102. Example of the identification parameters include, but are not limited to, a unique identification number associated with the meter, street name and house number, and a customer code, which may uniquely identify a meter and thus, a corresponding consumer. In one example, the device 104 may include a barcode reader, which may obtain a barcode installed on the meter to be read. In another example, the meter may have a radio frequency identification (RFID) tag. In said example, the device 104 may receive the identification parameters from the RFID tag.

Based on the received identification parameters, the extraction module 124 may identify a meter corresponding to the consumer under consideration. In an implementation, the extraction module 124 is further configured to extract historical data associated with the identified meter form the historical database 108. In another implementation, the extraction module 124 may also extract customer information from the customer database 110. Further, based on the extracted customer information, the extraction module 124 may extract the historical data from the historical database 108. The customer data may include customer information, for example, the customers address for identification of surrounding geographical area, type of customer, such as commercial, residential, etc., for determining the billing rate which may be relevant to a meter reading personnel for carrying out other functions like billing, type of meter such a dial or digital which may be used to configure the display. The historical database 108 may include information, such as previous resource consumption data, total number of months of resource consumption, total number of years. The historical database 108 may further include weather condition, for example, temperature, and pressure in the surrounding geographical areas of the consumer under consideration, resource consumption by consumers in the surrounding geographical area, and the like extracted based on the identified geographical region included in consumer information. Furthermore, the extraction module 124 may be configured to store the extracted the historical data and the customer data in the extracted data 132.

According to the described example, the meter reading personnel on reaching the desired location provides the identification parameters, say, by scanning a barcode provided on the utility meter. Based on the scanning a unique identification number, for example, XYZ123456789, associated with the meter is obtained by the extraction module 124. The extraction module 124 identifies the meter based on the identification parameter—XYZ123456789 and extracts information from customer database 110 associated with the identified meter. The customer information may include, for example, name—Mr. XYZ, Address—Long Road, ABC Drive, XYZ City—10001000, meter type—dial gauge. Further, the extraction module 124 extracts the historical data, such as pervious resource consumption as indicated by the meter for ever cycle, for example, in the months of January 2012 to December 2012 the resource consumption indicated by the meter is January—1345, February—1434, March—1546, April—1632, May—1793, June—1853, July—1964, August—2034, September—2450, October—2545, November—2746, and December—2846, Year—2011. Furthermore, the extraction module 124 may store the extracted customer data and historical data in the extracted data 132.

Upon obtaining the historical data, the prediction module 126 may compute the predicted resource consumption over a current cycle utilizing a resource consumption predicting technique. A cycle may be described as the predefined time period to collect resource consumption reading as indicated by the meter, for example a month, three month, half year, and year. The resource consumption predicting technique may determine various prediction parameters based on the historical data to compute the predicted resource consumption. The prediction parameters that may be computed based on the historical data include, for example, usage for the same month last year, usage for the same month averaged over a number of years, average usage averaged over a certain period of time, weather condition during the current cycle, weather condition averaged over predefined period, for example, average precipitation in a previous cycle, average temperature in the previous cycle; number of occupants at the property corresponding to the consumer under consideration, average usage by customers in the geographic area corresponding to the consumer under consideration, and any combination thereof. Further, the prediction module 126 may store the prediction parameters and the predicted resource consumption in the predicted data 134. Furthermore, the prediction module 126 may provide the predicted resource consumption to device 104 to be displayed to the meter reading personnel for assisting the meter reading personnel.

In said implementation, the prediction module 126 may also be configured to determine a display format of the meter based on the historical data and generate the predicted resource consumption in a format corresponding to the display format. The information pertaining to the display format may be stored in the customer data. For example, information pertaining to font and the number digits that are in the meter reading may be indicative of the display format. Further, the prediction module 126 may be configured to provide the predicted resource consumption in the format analogous with the display. For example, the format may be a dial format or digital format. The display of the predicted resource consumption as a replica of the meter to be read results in easy reading and easy editing of the predicted resource consumption.

In one other implementation the predicted meter reading may be computed by the prediction module 126 initially and be carried in a storage device included in the device 104 by the meter reading personnel to the meter location. Further in such implementation based on the identified meter to be read the extraction module 124 may extract the predicted resource consumption stored in the device 104. Further the predicted resource consumption may be displayed to act as a guide for the meter reading personnel in collection resource consumption data.

According to the described example, based on the resource consumption prediction technique, the prediction module 126 obtains the historic data to compute one or more prediction parameters. Further, using the prediction parameters the predicted resource consumption for the month of January 2013 may be determined. In the said example, the prediction parameters computed based on the historical data include total units of consumption for each month, such as resources consumption of each month of the year 2012 January—89, February—112, March—86, April—161, May—60, June—111, July—70, August—416, September—95, October—201, November—100, an average resource consumption over all the months as 136.4545. Further, in said example based on the prediction parameters, the predicted resource consumption of January 2013 is determined as 2958. Further, the predicted resource consumption is provided to the device 104 corresponding to the meter reading personnel, to be displayed and assist meter reading personnel.

In other example, equation (1) may be utilized to compute the predicted meter reading.

$$\left\{\left(\frac{x_n - x_1}{n - 1}\right) + X_n\right\} = y \quad (1)$$

wherein, $x_n$ reading representing resource consumption for a previous cycle;

$x_1$ represents reading for first available resource consumption;

y represents a predicted meter reading; and n represents total number of months.

In the said implementation, the computation module 128 may be configured to receive an observed resource consumption indicative of resource consumption displayed by the meter. In an example, the meter reading personnel may manually input an observed resource consumption by editing the displayed predicted resource consumption. In another example, the observed resource consumption may be fed in a field provided for same. In yet another example, the device 104 may include a camera and provide an image capturing the meter reading being displayed on the meter to the computation system 102. Further in the said example, optical character recognition technique may be utilized by computation system 102 to obtain the observed resource consumption. The computation module 128 may be configured to analyze the observed resource consumption in real time, with respect to the predicted resource consumption to accurately determine an actual resource consumption, which may aid in assisting the meter reading personnel. The analysis of the observed resource consumption in real time, with respect the predicted resource consumption may include a direct comparison, a comparison with a predefined acceptance criterion, such as ±5%. Further, based on such real time analysis the computation module 128 may issue multiple alerts for reconfirmation, for example, "Please reconfirm". Based on such alerts, the meter reading personnel may edit the predicted resource consumption or the initial observed resource consumption to provide new observed resource consumption. Further, the computation module 128 is configured to accept last entered observed resources consumption based on analysis and reconfirmation as the actual resource consumption and store it in the predicted data 134. The actual resource consumption signifies the observed resource consumption with minimum error. Furthermore, the computation module 128 may store the captured image for verification. In one other implementation, the computation module 128 may utilize the actual resource consumption and the customer information for generating a bill for the consumer subsequently.

Referring back to the example discussed before, the meter reading personnel edits the predicted resource consumption to provide an observed resource consumption. Further, the meter reading personnel may also capture an image of the meter and provided it to the system 102, which further utilizes an optical character recognition technique to capture the observed resource consumption. Further in the said example, the computation module 128 receives an observed resource consumption January 2013=2598. The computational module 128 analyses the predicted resource consumption of January 2013=2958 and observed resource consumption of January 2013=2598 based on direct comparison and predefined acceptance criterion of ±10%. Based on comparison the computation module 128 issues an alert, such as "Please Check Observed Resource Consumption—not matching and below 10% acceptance criterion" to the meter reading personnel to reconfirm the observed resource consumption provided. Further, the meter reading personnel may edit or renter the observed resource consumption. Based on such alerts and reconfirmation an actual resource consumption is determined. The actual resource consumption signifies the last observed resource consumption provided by the meter reading personnel determined based on the analysis and reconfirmation. In another implementation, the meter reading personnel may put a comment in cases the observed resource consumption is accurate and deviating substantially from the predicted resource consumption. Thus, the present subject matter assists the meter reading personnel in determining resource consumption and assimilating data, thereby increasing accuracy.

In another implementation of the subject matter, the computation system 102 may be included inside the device 104. In such implementation, the meter reading personnel may carry the device 104 to the location of the meter. The device 104 may receive identification parameters, such as house name customer number and further identify the meter to be read. In one embodiment the identification parameters may be provided by the meter reading personnel, or may be captured using a bar code, a camera, and a RFID tag reader by the meter reading personnel. Further the device 104 may extract historical data associated with the identified meter. The historical data may include pervious cycle resource consumption, and like, as described. The device 104 may further compute a predicted resource consumption and displays it on a interface to assist the meter reading personnel.

Further, the meter reader may edit predicted resource consumption, for example, change few digits or freshly enter an observed resource consumption as displayed by the meter utilizing the predicted resource consumption as guide. In another example, the meter may be captured as an image and optical character recognition may be utilized to obtain observed resource consumption. An analysis is further performed by the device based on the predicted resource reading and the observed meter reading. Furthermore, an alert may be issued by the device asking the meter reader to reconfirm the observed meter reading. Based on such reconfirmation, an actual resource consumption is determined. Thus, the present subject matter utilized in the device 104, in assimilating resource consumption determining actual resource consumption and data, thereby increasing accuracy.

It would be understood by any person skilled in the art that though the present subject matter is explained using a meter, it is merely an embodiment. Any application for the purpose of reading a number or character or strings or pictures or shapes off an instrument or meter, predicted utilizing some historical information or predefined criterion would not differ from the scope of the present subject matter.

FIG. 2 illustrates a method 200 for determining resource consumption by a user according to an embodiment of the present subject matter. The method 200 may be described in the general context of computer executable instructions. Generally, computer executable instructions can include routines, programs, objects, components, data structures, procedures, and modules, functions, which perform particular functions or implement particular abstract data types. The method 200 may also be practiced in a distributed computing environment where functions are performed by remote processing devices that are linked through a communication network. In a distributed computing environment, computer executable instructions may be located in both local and remote computer storage media, including memory storage devices.

The order in which the method 200 is described is not intended to be construed as a limitation, and any number of the described method blocks can be combined in any order to implement the method 200, or alternative method. Additionally, individual blocks may be deleted from the method 200 without departing from the spirit and scope of the subject matter described herein. Furthermore, the method 200 can be implemented in any suitable hardware, software, firmware, or combination thereof. In an example, the method 200 may be implemented in a computing system, such as a computation system 102.

Referring to method 200, at bock 202, obtain identification parameters corresponding to a meter to be read. The identification parameters help identify a meter to be read so that relevant information pertaining to the meter may be gathered. In an implementation, the extraction module 124 obtains the identification parameters to identify the meter under consideration.

At block 204, historical data associated with the identified meter to be read is extracted. The historical data may include previous cycle resource consumption data. In an implementation, the extraction module 124 extracts historical data associated with the identified meter.

At block 206, a predicted resource consumption for a current cycle is computed utilizing the extracted historical data. Further, a resource consumption predicting technique is utilised for computing the predicted resource consumption. In an implementation, the prediction module 126 computes the predicted resource consumption for a current cycle utilizing the extracted historical data.

At block 208, the predicted resource consumption is provided for assisting a meter reading personnel in reading the resource consumption. The predicted meter reading acts as a guide for the meter reading personnel during collection of resource consumption data. In an implementation. In an implementation, the prediction module 126 provided the predicted resource consumption for assisting a meter reading personnel.

At block 210, an observed resource consumption for the current cycle is received. In an implementation the observed resource consumption may be provided by editing the predicted resource consumption. In another implementation it may be received in form of an image captured by a camera and further optical character recognition is used to obtain the observed resource consumption. In one more implementation, the computation module 128 receives the observed resource consumption for further analysis.

At block 212, the observed resource consumption and the predicted resource consumption are analysed to determine an actual resource consumption. The analysis involves comparison between the observed resource consumption and the predicted resource consumption along with a comparison with a predefined acceptance criterion to issue reconfirmation alerts. Such analysis assists the meter reading personnel in determining resource consumption and assimilating data, thereby increasing accuracy. In one more implementation, the computation module 128 analyzes the observed resource consumption and the predicted resource consumption to determine an actual resource consumption for increasing accuracy.

Although implementations for determining consumption of resources have been described in language specific to structural features and/or method, it is to be understood that the appended claims are not necessarily limited to the specific features or method described. Rather, the specific features and method are disclosed as exemplary implementations for determining consumption of resources.

I claim:

1. A computation system for determining consumption of resources in real time, the computation system comprising:
   a processor; and
   a prediction module executable by the processor to,
      determine a predicted resource consumption for a current cycle based on a historical data, wherein the historical data includes previous resource consumption data associated with a meter to be read; and
      provide the predicted resource consumption to a meter reading device for displaying the predicted resource consumption to a meter reading personnel; and
   a computation module executable by the processor to,
      receive an observed resource consumption from the meter reading device, the observed resource consumption being indicative of resource consumption displayed by the meter; and
      determine an actual resource consumption for the current cycle, based on an analysis of the observed resource consumption of the current cycle with respect to the predicted resource consumption.

2. The computation system as claimed in claim 1, further comprises an extraction module executable by the processor to extract the historical data associated with the meter.

3. The computation system as claimed in claim 2, wherein the extraction module is further configured to identify the meter based on at least one identification parameter, wherein the at least one identification parameters uniquely identifies the meter.

4. The computation system as claimed in claim 3, wherein the at least one identification parameter includes one of a barcode, a radio frequency identification code, a customer number, and an image.

5. The computing system as claimed in claim 1, wherein the prediction module is further configured to,
   determine a display format of the meter based on the historical data; and
   generate the predicted resource consumption in a format corresponding to the display format.

6. The computation system as claimed in claim 1 further comprises a camera for capturing an image, wherein the image includes the observed resource consumption.

7. The computation system as claimed in claim 1, wherein the analysis includes a comparison of the observed resource consumption with the predicted resource consumption based on a predefined acceptance criterion.

8. The computation system as claimed in claim 1, wherein the computation module is further configured to issue alerts based on the analysis.

9. The computation system as claimed in claim 1, wherein the computation module is further configured to allow editing of the predicted resource consumption to receive the observed resource consumption.

10. A computer implemented method for determining consumption of resources, the method comprising:
   providing a predicted resource consumption for a current cycle of a meter to be read to a meter reading device for displaying the predicted resource consumption to a meter reading personnel;
   receiving an observed resource consumption of the current cycle, wherein the observed resource consumption is indicative of the resource consumption displayed by the meter; and
   analysing the observed resource consumption with respect to the predicted resource consumption based on predefined acceptance criterion, in real time to determine an actual consumption of resources.

11. The method as claimed in claim 10, wherein the providing further comprises:
   extracting historical data associated with the meter based on identification parameters, wherein the historical data includes pervious resource consumptions data associated with the meter; and
   determining the predicted resource consumption based on the historical data.

12. The method as claimed in claim 11, wherein the extracting further comprises:
   identifying the meter to be read based on the identification parameters to retrieve information pertaining to the meter.

13. The method as claimed in claim 10, wherein the analysing comprises
   determining a difference between the predicted resource consumption and the observed resource consumption; and
   computing whether the difference is in predetermined range, based on the predefined acceptance criterion.

14. The method as claimed in claim 13, wherein the computing further comprises issuing alerts for reconfirmation of the observed resource consumption.

15. The method as claimed in claim 10, wherein the receiving further comprises requesting the meter reading personnel to edit the predicted resource consumption to provide the observed meter reading.

16. A non-transitory computer-readable medium having embodied thereon a computer readable program code for executing a method for determining consumption of resources, the method comprising:
   providing a predicted resource consumption for a current cycle of a meter to be read, to a meter reading device for displaying the predicted resource consumption to a meter reading personnel;
   receiving an observed resource consumption of the current cycle, wherein the observed resource consumption is indicative of the resource consumption displayed by the meter; and
   determining an actual consumption of resources for the current cycle based on an analysis of at least the observed resource consumption, and the predicted resource consumption.

* * * * *